K. AHLQUIST.
LIQUID SEAL OR PACKING.
APPLICATION FILED JUNE 6, 1908.
945,900.
Patented Jan. 11, 1910.
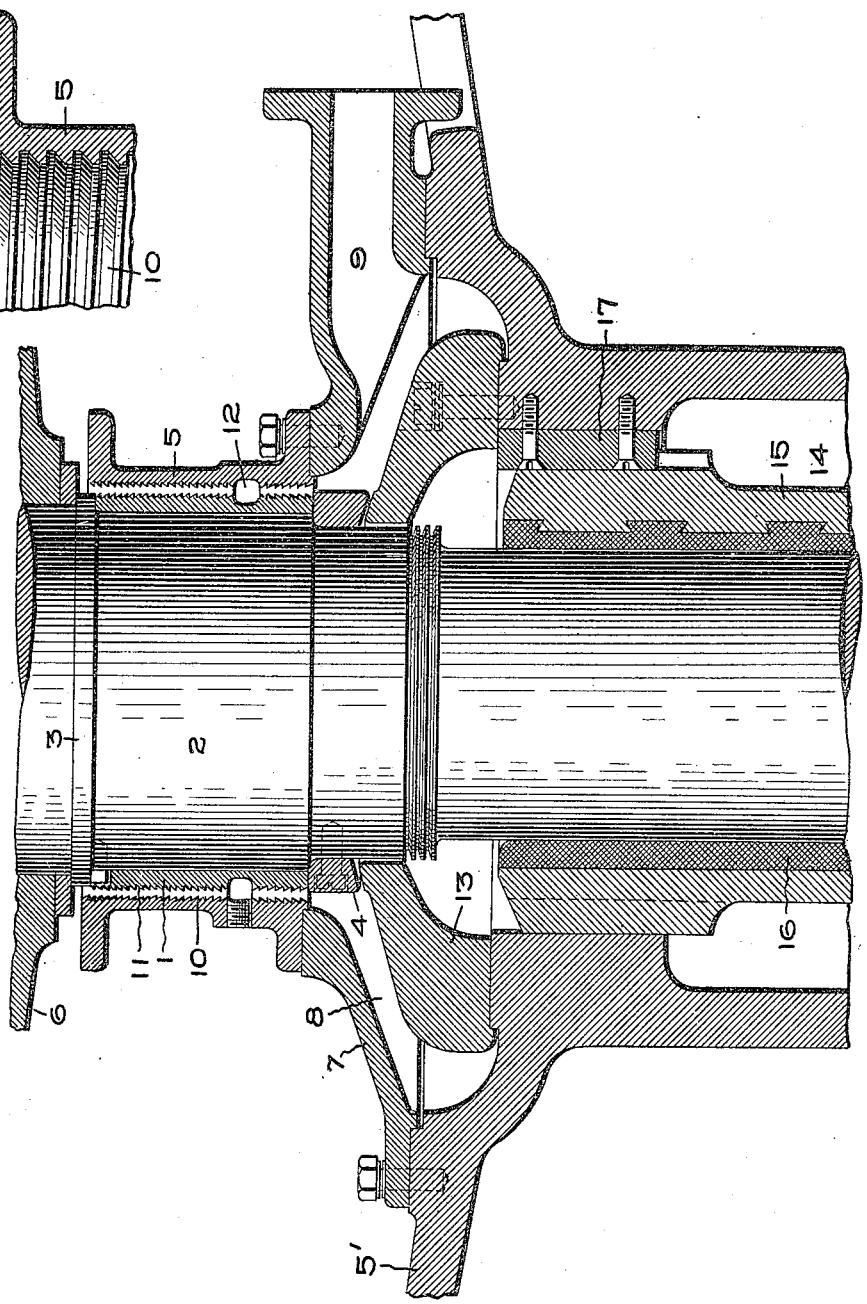

UNITED STATES PATENT OFFICE.

KARL AHLQUIST, OF RUGBY, ENGLAND, ASSIGNOR TO GENERAL ELECTRIC COMPANY, A CORPORATION OF NEW YORK.

LIQUID SEAL OR PACKING.

945,900.  Specification of Letters Patent.  Patented Jan. 11, 1910.

Application filed June 6, 1908. Serial No. 437,151.

*To all whom it may concern:*

Be it known that I, KARL AHLQUIST, a subject of the King of Sweden, residing at Clifton Road, Rugby, England, have invented certain new and useful Improvements in Liquid Seals or Packings, of which the following is a specification.

The present invention relates to improvements in liquid pressure seal shaft packings for the purpose of preventing leakage of liquid, or of vapor or other elastic fluid into or from an apparatus or machine.

My invention is more particularly intended for preventing steam or air from leaking between the shaft and the casing of a turbine, and, in the case of a combined turbine and condenser, for preventing lubricant from leaking from the shaft bearings into the condenser, but it will be obvious that the invention is not limited to the specific applications just mentioned.

My invention includes the idea of creating a pressure of liquid to balance the difference of pressure tending to cause leakage by means of a screw-pump which is composed of a screw-thread moving with the rotating shaft and a screw-thread in a member or sleeve formed in or supported by the casing of the apparatus through which the shaft passes. The screw-threads are separated by a small clearance, measured radially, in which the liquid is contained and maintained at the desired pressure for preventing leakage of elastic fluid or of the liquid itself into or from the apparatus.

In the drawing, Figure 1 illustrates one of the embodiments of my invention as applied to a shaft packing for a steam turbine to prevent steam escaping from the last stage when the turbine is running non-condensing and to prevent the entrance of air when the turbine is running condensing; Fig. 2 is an enlarged detail view.

In carrying my invention into effect as illustrated in the accompanying drawing, I provide a sleeve member or rotor 1 secured to the turbine shaft 2 between a collar 3 and a clamping ring 4 at the part where it passes through the casing 5'. Located above the collar and supported by it is a bucket wheel 6, a part only of which is shown. The sleeve 1 is surrounded by a corresponding sleeve member or stator 5 supported by a casting 7 carried by the turbine casing. The casting 7 and the bucket wheel casing 5' coöperate to form a chamber 8 to which is connected an air pipe or conduit 9. The two sleeves, which are of suitable length, are provided for a portion or all of their length at the two extremities with helical or spiral grooves or screw-threads 10 and 11 of coarse pitch, the rotating and stationary threads running right-handedly and left-handedly respectively from one end and oppositely from the other. A liquid such as water is introduced into the clearance between the two sleeves by an annular supply chamber 12 located intermediate the sets of threads, and these threads are so arranged that when the shaft is rotating, the water contained in the clearance between the two sleeves is screwed or pumped from the ends of the sleeves toward the chamber 12 to which it is introduced by a suitable pipe. In this way leakage of steam from the turbine when running non-condensing or the entrance of liquid into the vacuum chamber when running condensing is prevented. The radial clearance between the screw-threads on the rotating and stationary parts is sufficient to allow the shaft to be freely withdrawn from the surrounding casing.

In a form of screw-thread which I have found to give good results the pressure face of the thread is square as clearly illustrated in Fig. 2. The particular pitch of the screw used is dependent upon the speed of the shaft and the pressure to be resisted by the liquid pressure. By making the screw of fine pitch and a single or feed thread it is possible to obtain good results. I prefer however to use a fairly coarse pitch and a large number of threads, thereby avoiding an unnecessarily long packing. A suitable angle of inclination for the screw-thread which I have found suitable for ordinary commercial turbines is from 20 to 50 degrees.

This packing has been developed especially with a view to providing a satisfactory and inexpensive water seal around the upright shaft of a turbine, which packing is located between the last stage and the step and guide-bearing when the latter are lubricated with oil. The water contained in the clearance and moving at about half the speed of the rotor will be screwed or pumped from both the upper and lower ends of the sleeves or members toward the annular supply chamber 12. The grooves in the rotor are right-handed at the upper end above the chamber and are reversed or left-handed at the lower end below the chamber, assuming a counter-clockwise direction of rotation of the shaft looking down on the end thereof. The annular column of water above the chamber serves to balance against the vacuum, and the annular column below the chamber serves to balance against pressures when running non-condensing. The water column on the vacuum side will be of a sufficient height to balance the pressure difference between the water supply and the condenser vacuum. That is to say, the height of the water column is such that the axial speed of the water due to the suction of the vacuum is about equal to the axial speed of the water in the opposite direction due to the screw-action between the relatively rotating parts.

In order to prevent water from getting down into the guide bearing the ring 4 is provided with an inclined under side which acts as a throwing device to prevent the water from creeping along the shaft. Situated below this and supported by the wheel casing 5' or the bearing support is an annular element 13 which in addition to conveying the water away from the shaft and permitting it to collect in the surrounding chamber serves to support the weight of the revolving structure when the step-bearing is removed. It is to be noted that the diameter of the ring 4 is less than that of the bore of the sleeve 5 which enables the shaft and its parts to be withdrawn without disturbing the sleeve 5 and the lower guide bearing.

Situated below the packing is a guide bearing 14 comprising an annulus 15 having a lining 16 of Babbitt or other metal. The annulus is prevented from turning by the spline 17 that fits into a correspondingly shaped slot.

Owing to the construction of the parts described, the packing will, when the turbine is running, consume only a very small amount of power, which is a very desirable feature, since whatever power is consumed decreases the efficiency of the turbine by a certain amount.

I have described a construction of packing which is suitable for the double purpose of preventing leakage into or from the casing, but it will be obvious that the invention may also be used for either purpose alone, and further that the specific construction may be modified as above indicated without departing from the spirit of the invention.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is:—

1. A shaft packing comprising a movable member, a second member surrounding the first and separated therefrom by a clearance, a screw-thread carried by one of the members for maintainig a body of liquid in the clearance, and means for supplying liquid to the screw-thread.

2. A shaft packing comprising a movable member, a second member surrounding the first and separated therefrom by a clearance, and screw-threads carried by both of the members for maintaining a body of liquid in the clearance, and means for supplying liquid to the clearance where it will be acted upon by the threads.

3. A shaft packing comprising a movable member, a second member surrounding the first and separated therefrom by a clearance, oppositely cut screw-threads carried by the members for maintaining a body of liquid in the clearance, and a chamber containing liquid into which the threads extend.

4. A shaft packing comprising a movable member, a second member surrounding the first and separated therefrom by a clearance, a chamber between the ends of said members communicating with the clearance to which liquid is admitted, a screw-thread carried by one of the members the end of which enters the chamber, and a chamber and conduit communicating with the clearance at one end.

5. In combination, a shaft, a packing comprising a sleeve mounted on the shaft, a member surrounding the sleeve and separated therefrom by a clearance, a chamber communicating with the clearance to which liquid is admitted, and oppositely disposed screw-threads which coöperate to force liquid from the clearance toward the chamber.

6. A shaft packing comprising a movable member, a surrounding member separated from the first by a clearance, and oppositely arranged screw-threads carried by the members for maintaining a body of liquid in a region between the ends of the members.

7. A shaft packing comprising a movable member, a surrounding member separated from the first by a clearance, screw-threads carried by each of the members, the threads on each member being arranged in sets which are cut in opposite directions.

8. A shaft packing comprising a rotor, a stator separated from the rotor by a clearance, a right handed screw-thread on one end of the rotor, and a left handed screw-thread on the other end of the rotor, both of said screw-threads acting to pump liquid.

9. A shaft packing comprising a rotor, a stator separated from the rotor by a clearance, a screw-thread on one of the parts for moving a column of liquid, a chamber between the ends of the rotor, and means for introducing liquid to the chamber to be acted upon by the screw.

10. In a packing, the combination of a rotor, a stator separated from the rotor by a clearance, an annular chamber, means carried by the parts for moving a column of liquid axially toward the chamber in one direction, and a second means also carried by the parts for moving a column of liquid axially and in the opposite direction toward said chamber.

11. In a packing, the combination of a rotor, a stator separated from the rotor by a clearance, a screw-thread carried by one of the parts for moving a column of liquid, a casing containing a chamber, a conduit supplying liquid to the chamber, and a means carried by the rotor for discharging liquid issuing from one end of the screw-thread into the chamber.

12. In a packing, the combination of a rotor, sets of oppositely cut screw-threads on the rotor, a stator inclosing the rotor, oppositely cut screw-threads on the stator, the screw-threads on the parts being separated by a clearance, and the adjacent threads on the rotor and stator being oppositely cut.

In witness whereof, I have hereunto set my hand this thirteenth day of May, 1908.

K. AHLQUIST.

Witnesses:
REGINALD FRANCIS HALLIWELL,
C. G. SEELEY.